June 2, 1931. J. A. FLEISCHLI ET AL 1,807,591
MEANS FOR ASSEMBLING NUTS AND BRIDGE WASHERS ON VALVE STEMS
Filed Aug. 7, 1929 3 Sheets-Sheet 1
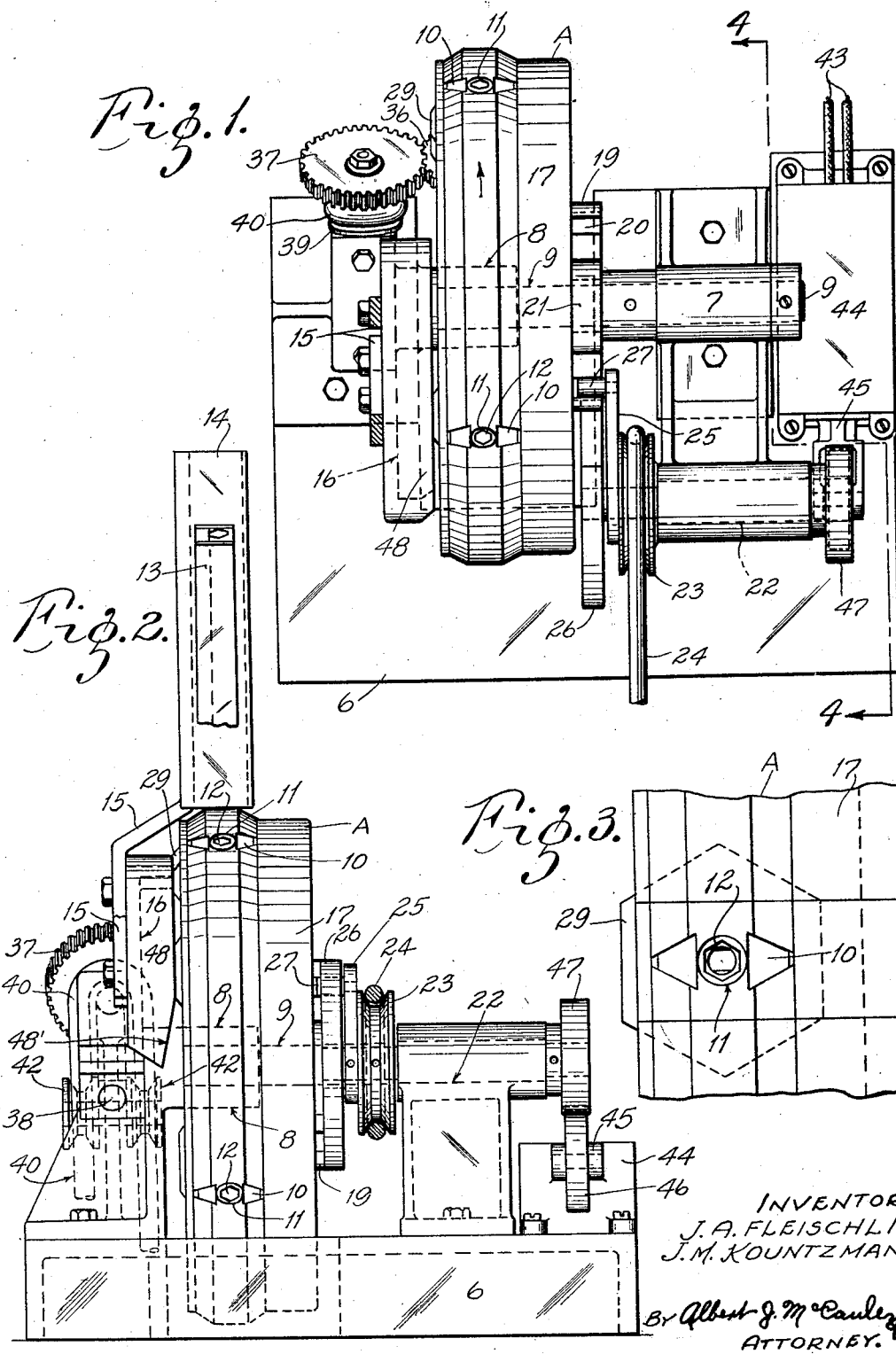
INVENTORS:
J. A. FLEISCHLI
J. M. KOUNTZMAN
By Albert J. McCauley
ATTORNEY.

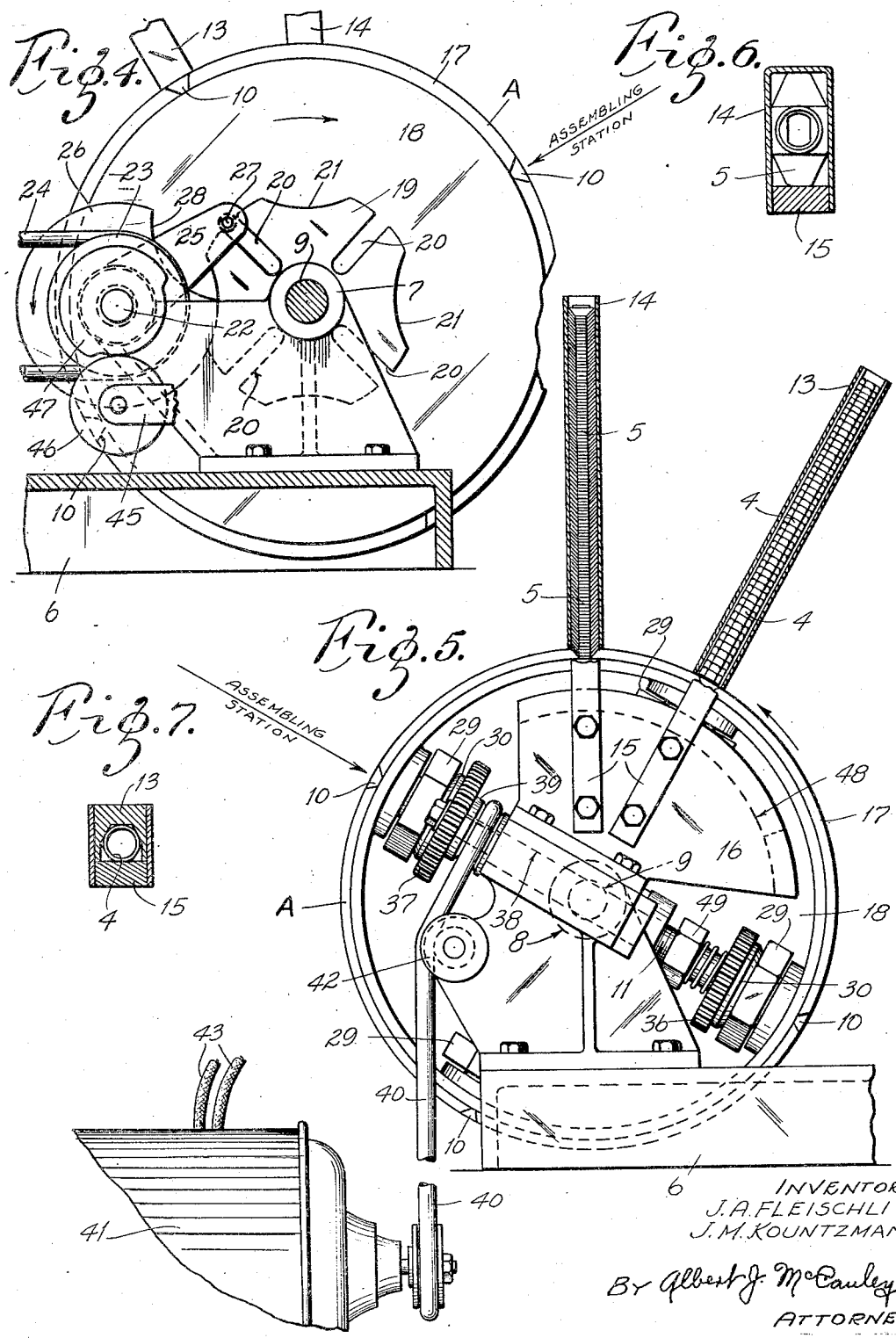

June 2, 1931.  J. A. FLEISCHLI ET AL  1,807,591
MEANS FOR ASSEMBLING NUTS AND BRIDGE WASHERS ON VALVE STEMS
Filed Aug. 7, 1929  3 Sheets-Sheet 3
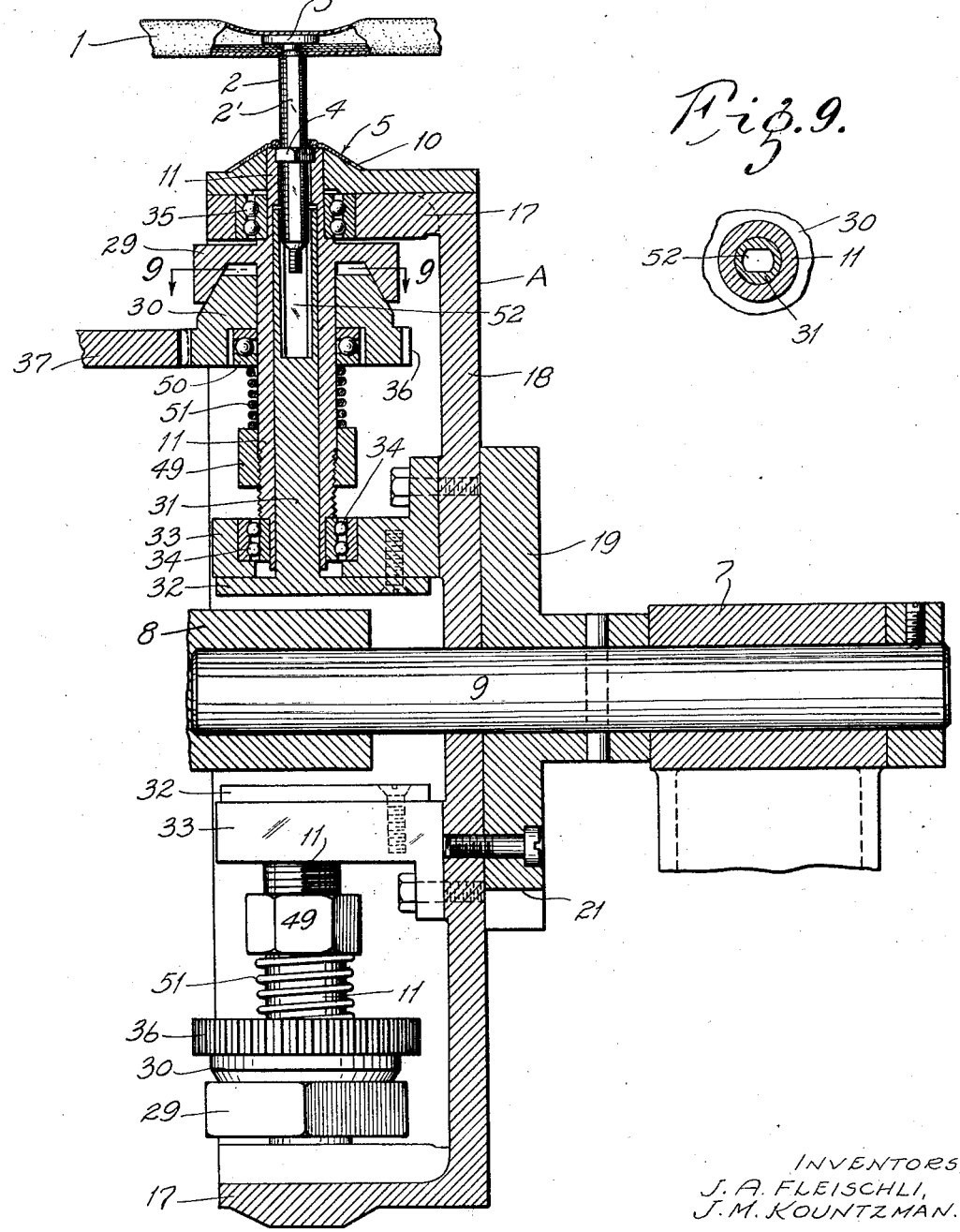
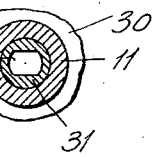
INVENTORS:
J. A. FLEISCHLI,
J. M. KOUNTZMAN.
By Albert J. McCauley
ATTORNEY.

Patented June 2, 1931

1,807,591

UNITED STATES PATENT OFFICE

JOHN A. FLEISCHLI, OF CLAYTON, AND JOSEPH M. KOUNTZMAN, OF ST. LOUIS, MISSOURI, ASSIGNORS TO CUPPLES COMPANY, OF ST. LOUIS, MISSOURI, A CORPORATION OF MISSOURI

MEANS FOR ASSEMBLING NUTS AND BRIDGE WASHERS ON VALVE STEMS

Application filed August 7, 1929. Serial No. 384,100.

This invention relates to means for assembling nuts and bridge washers on valve stems, such as the valve stems of inner tubes used in tire casings.

The ordinary rubber inner tube is provided with a long threaded valve stem having a flange inside of the tube. A bridge washer contacts with the outer face of the tube, and a nut is applied to the threaded valve stem, the nut being firmly seated on a bridge washer to secure the several elements to the rubber tube.

Prior to this invention, these elements have been assembled by hand, and the work involved several operations including the step of placing the bridge washer on the valve stem, then starting the nut on the valve stem by hand, and finally using a wrench to complete the work of screwing the nut along the valve stem and tightening it on the bridge washer. In a large inner tube factory, a great deal of time is devoted to the details of these old assembling operations. Each bridge washer is picked up by hand and placed on a valve stem, and each nut is also picked up by hand and then carefully started on the threads of the valve stem before a wrench is used to complete the operation.

One of the objects of this invention is to provide a feasible and entirely practicable apparatus whereby the nut can be easily and quickly placed in a wrench which is preferably rotated to start the nut on the valve stem and to complete the work of screwing the nut along the valve stem and tightening the nut on the bridge washer.

Another object is to eliminate the hand operations heretofore involved in picking up bridge washers and placing them on the valve stems.

More specifically stated, an object is to provide an apparatus whereby the nut and bridge washer are properly alined with each other while the nut is located in a rotating wrench, so that the assembling can be completed by merely inserting the valve stem through the bridge washer and into the rotating nut.

We will hereafter show how the nut and bridge washer can be picked from separate rows at supply stations, and held in proper alinement while they are carried to an assembling station where the nut is rotated. All of these preliminary operations may be performed at any desired speed, without requiring the aid of an operator, and it is then only necessary to insert the threaded valve stem through the bridge washer and into the rotating nut alined therewith.

The several steps of the assembling operation are thus carried out very easily, as the nut and bridge washer are properly positioned and the nut is rotated at the assembling station, without resorting to any of the hand operations heretofore employed in picking up the nut and bridge washer and placing them on the threaded stem. The operator merely picks up the inner tube and inserts its valve stem through the alined nut and bridge washer, with the result of firmly assembling all of these parts.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a top view of an apparatus embodying the features of this invention.

Fig. 2 is a rear view with a portion of the nut holder broken away to show the end of the wrench which is alined with this holder.

Fig. 3 is an enlarged plan view of a portion of the carrier, showing one of the wrenches and the seat for the bridge washer.

Fig. 4 is a side view showing the driving mechanism.

Fig. 5 is a view of the side opposite to that shown in Fig. 4, with the holders for the nuts and bridge washers shown in section.

Fig. 6 is a transverse section through the holder, or magazine, for the bridge washers.

Fig. 7 is a transverse section through the similar magazine which holds the supply of nuts.

Fig. 8 is a fragmentary section, on a larger scale, taken on a line through the assembling station, and showing a portion of a rubber tube with its valve stem inserted through a nut and bridge washer.

Fig. 9 is a section taken approximately on the line 9—9 in Fig. 8, with the outer portions of the clutch members broken away, the object being to show the passageway in a restraining member which prevents rotation of the valve stem during the assembling operation.

The upper portion of Fig. 8 shows a fragment of an inner tube 1 provided with the usual threaded valve stem 2 having a flange 3 inside of the tube, and adapted to receive a nut 4 and a bridge washer 5, both of which surround the valve stem 2. In Fig. 8 these elements are only partly assembled, the nut 4 being in a wrench to be hereafter described, and this wrench is rotated while the valve stem 2 moves longitudinally, thereby firmly clamping a portion of the rubber tube between the bridge washer 5 and the flange 3 at one end of the valve stem. This threaded stem 2 is of the usual type, having flat sides as shown at 2' in Fig. 8.

To describe one form of the invention we will hereafter refer to a supporting means provided with a wrench to receive the nuts and a seat for the bridge washer alined with the wrench, and a second supporting means for the supply of nuts and bridge washers. One of these supporting means is moved relative to the other to locate a nut in the wrench and a bridge washer on the seat alined therewith, and the valve stem is then inserted through the nut and bridge washer while the wrench is rotated to complete the operation.

The movable supporting means may be a carrier which turns step by step to pick up the nut and bridge washer and carry them to the assembling station.

The apparatus herein shown includes a table 6 provided with bearings 7 and 8 for a shaft 9 which is fixed to a rotary carrier A, as will be hereafter described, the periphery of said carrier being provided with seats 10 in the form of recesses to receive the bridge washers, and wrenches 11 alined with said seats, each wrench having a hexagon socket 12 exposed at the periphery of the carrier to receive the hexagon nuts.

The delivery stations are preferably formed by stationary magazines, or holders, 13 and 14 containing the supply of nuts and bridge washers. The holder 14 (Figures 2, 5 and 6) is arranged immediately above the rotary carrier and it contains a vertical row of the bridge washers 5, said holder being open at the bottom so that the bottom bridge washer will rest upon the periphery of the carrier. The holder 13 is likewise located over the carrier to hold the row of nuts 4, and the bottom nut rests upon the periphery of the carrier, or in one of the wrenches, when the wrench is alined with the row of nuts.

Each of these stationary holders 13 and 14 may be made of sections, as shown in Figures 6 and 7, and the sections of each holder may be suitably united to form a tubular support wherein a row of the nuts, or bridge washers, is confined. Each of said stationary holders is provided with a leg 15 (Figures 2 and 5) secured to a wing 16 which extends from the stationary bearing 8.

In the apparatus we have shown to illustrate the invention, the rotary carrier A moves step by step in the direction indicated by arrows in Figures 4 and 5, and when one of the wrenches 11 passes under the row of nuts 4 in the holder 13, the bottom nut drops into the socket at the upper end of the wrench. Continued movement of the carrier moves this nut away from the holder 13 and locates it under the holder 14, where the bridge washer drops into the recessed seat 10. The bridge washer is thus located over and in alinement with the nut, and these elements are interlocked with the rotary carrier, so they are securely held in alinement with each other as they travel on to the assembling station where they are assembled to receive the valve stem, as will be hereafter described.

The rotary carrier A comprises a peripherial flange 17 extending from a web 18, the latter being secured to a Geneva wheel 19 which is fixed to the shaft 9 as shown in Fig. 8, so the carrier will turn with the shaft 9. The Geneva wheel has radial slots 20 (Fig. 4) and curved faces 21. It forms part of a means for intermittently moving the carrier, although any other suitable driving mechanism may be employed. A shaft 22 (Figures 1, 2 and 4) is provided with a pulley 23, which is constantly driven by a belt 24. The Geneva movement includes a crank arm 25 and a disk 26 fixed to the constantly rotating shaft 22, the crank having a pin 27 and the disk being provided with a notch 28, as shown in Fig. 4. During each revolution of the crank arm 25, the pin 27 enters one of the slots 20 and turns the carrier A one fourth of a revolution, and the carrier is then locked by engagement of the periphery of the disk 26 with one of the curved faces 21 on the Geneva wheel. The carrier is thus driven intermittently with intervals of rest for the assembling operation. This rotary carrier is provided with four sets of the elements which receive the nuts and bridge washers, and each set includes a wrench and various elements associated therewith. However, the sets referred to are all alike, so a description of any one set will explain the others.

Each set includes a wrench 11 in the form of a tube (Figures 8 and 9) provided with a driven clutch member 29 contacting with a driving clutch member 30 which is slidable on the body of the tubular wrench 11.

This tubular body is arranged radially of the carrier and it is rotatably supported on a radial stem 31, said stem being rigidly secured to the carrier, as shown in Fig. 8. Said stem 31 is united with a plate 32 secured to a bearing 33, and this bearing is in turn secured to the web 18 of the carrier, as shown in Fig. 8. The inner end of the tubular wrench 11 is mounted in a ball bearing device 34 supported by the bearing 33 as shown in Fig. 8, and the outer portion of the tubular wrench is held by a similar ball bearing 35 in the peripheral flange 17 of the carrier.

It will now be understood that the central stem 31 is rigidly secured to the rotary carrier, so as to travel with the carrier, but it cannot move independently of the carrier. However, the tubular wrench 11 not only travels with the carrier, but it is also free to rotate on its own axis which lies radially of the carrier. The means for rotating the wrench on its own axis comprises the clutch member 29 which may be formed integral with the wrench, the clutch member 30 frictionally engaging said clutch member 29, and teeth 36 on the periphery of the clutch member 30.

The means for transmitting power to the wrenches comprises a gear wheel 37 located at the assembling station and adapted to mesh with the teeth 36. The driving gear 37 is secured to the shaft 38 (Fig. 5) provided with a pulley 39 which receives a belt 40 driven by a motor 41. This belt 40 passes over idle wheels 42 which guide it to and from the pulley 39.

When one of the wrenches arrives at the assembling station, the gear teeth on its clutch member 30 mesh with the driving gear 37, and the motor 41 is then operated to transmit power to the wrench.

It is not necessary to operate the motor continuously, and it may be controlled in any suitable manner to provide for the operation of the wrenches while they are located at the assembling station. For example, current may be transmitted to the motor 41 through the wires 43 shown in Figures 1 and 5, and the housing 44 in Fig. 1 may contain a switch having an operating arm 45 to control the transmission of current through the wires 43. This operating arm appears in Figures 1, 2 and 4. It is provided with a roller 46 engaged by a cam 47 on the shaft 22, to provide for the transmission of current to the motor which drives the wrenches.

When a wrench is alined with the row of nuts 4, one of the nuts drops into the socket at the end of the wrench, and it is therefore important to aline the non-circular socket with the non-circular nut at some time after the wrench leaves the assembling station and before it is to receive another nut. The alining means herein shown comprises a stationary cam 48 (Figures 1, 2 and 5) in the form of a flange extending from the wing 13. Each clutch member 29 is provided with a hexagon outer face (Fig. 3) conforming to the hexagon socket 12 in the wrench. The clutch member 29 is united with the wrench 11, so when the outer face of said clutch member 29 engages the stationary cam 48, as shown in Fig. 2, the socket in the wrench will be properly positioned to receive a nut from the magazine 13. One end of the cam 48 is beveled as shown at 48' in Fig. 2, so as to aid in deflecting the clutch members 29 when they contact with the alining cam.

In assembling the nut and bridge washer, the operator forces the valve stem 2 into the wrench, as shown at Fig. 8, while the wrench is being driven, and this operation is continued until the bridge washer 5 is firmly clamped between the nut and the tube 1. At this time, the desired forcible assembling is obtained by transmitting the power through the friction clutch members 29 and 30, the member 30 being adapted to slip and turn independently of the clutch member 29 at the end of the operation. The pressure at the friction surfaces determines the degree of pressure with which the nut is tightened, and this can be varied by making an adjustment of a nut 49, which is shown most clearly in Fig. 8. The clutch member 30 is provided with a ball bearing 50, and a spring 51 is located between this bearing and the nut 49. It will be seen that the nut 49 can be adjusted on the tubular wrench 11, to vary the pressure of the spring 51, thereby varying the pressure at the friction surfaces of the clutch members 29 and 30.

We will now show how the valve stem 2 (Fig. 8) is held to prevent rotation while it is passing through the rotating nut. This feature is especially important at the end of the operation when the nut is tightened on the valve stem. Figures 8 and 9 show that the central core, or stem 31 is provided with a passageway 52 to receive the valve stem 2, and that this passageway is non-circular in cross section, so as to conform to the valve stem 2. The member 31 is adapted to travel with the carrier, but it cannot move independently of the carrier.

Therefore, when the valve stem is inserted into said member 31, the latter serves as a restraining member to prevent rotation of the valve stem. Fig. 8 shows that the valve stem 2 can be inserted through the socket at the end of the wrench, and then into the passageway 52 in the member 31 which does not turn with the wrench.

We claim:

1. In an apparatus for applying nuts and bridge washers to the threaded valve stems of pneumatic tubes, an assembling station where said parts are assembled, delivery stations provided with a holder for the nuts, and a holder for the bridge washers, a carrier whereby the nuts and bridge washers are transferred from said holders to said assembling station, and driving means whereby said nuts are rotated to receive the valve stems at said assembling station.

2. In an apparatus for applying nuts and bridge washers to the threaded valve stems of pneumatic tubes, an assembling station where said parts are assembled, delivery stations provided with a holder for the nuts, and a holder for the bridge washers, a carrier whereby the nuts and bridge washers are transferred from said holders to said assembling station, said carrier including a wrench to receive the nuts from one of said holders and a seat to receive the bridge washers from the other station, said seat being in alinement with said wrench to locate the bridge washer in alinement with the nut, and driving means whereby said wrench is rotated at said assembling station.

3. In an apparatus for assembling nuts and bridge washers on the valve stems of pneumatic tubes, an assembling station where said parts are assembled, delivery stations provided with a holder wherein a row of bridge washers is confined and a holder wherein a row of nuts is confined, a carrier having a seat adapted to be alined with the first mentioned holder to receive the bridge washer at the end of the row of bridge washers, said carrier being provided with a wrench adapted to be alined with the nut holder to receive the nut at the end of the row of nuts, intermittent operating means whereby said carrier is driven to move the wrench, nut and bridge washer from said delivery stations to said assembling station, and means whereby said wrench is rotated at said assembling station.

4. In an apparatus for assembling nuts and bridge washers on valve stems of pneumatic tubes, supporting means provided with a rotary wrench and having a seat for a bridge washer adjacent to and in alinement with said wrench, and a second supporting means including a holder for a supply of nuts and a holder for a supply of bridge washers, said nuts and bridge washers being in separate rows and one end of each row being in contact with the first mentioned supporting means, and operating means whereby one of said supporting means is moved relative to the other to deliver a nut and bridge washer to said wrench and seat, said operating means being adapted to locate the wrench in a nut-receiving position at said end of the row of nuts and then locate said seat in a receiving position at said end of the row of bridge washers, and said wrench being provided with an opening into which the valve stem may be inserted to receive the nut and bridge washer.

5. In an apparatus for assembling nuts and bridge washers on valve stems of pneumatic tubes, supporting means provided with a rotary wrench and having a seat for a bridge washer adjacent to and in alinement with said wrench, and a second supporting means including a holder for a supply of nuts and a holder for a supply of bridge washers, said nuts and bridge washers being in separate rows and one end of each row being in contact with the first mentioned supporting means, operating means whereby one of said supporting means is moved relative to the other to deliver a nut and bridge washer to said wrench and seat, said operating means being adapted to locate the wrench in a nut-receiving position at said end of the row of nuts and then locate said seat in a receiving position at said end of the row of bridge washers, and an alining member cooperating with said rotary wrench to aline it with said row of nuts, said wrench having an opening into which the valve stem may be inserted to receive the nut and bridge washer.

6. In an apparatus for assembling nuts and bridge washers on valve stems of pneumatic tubes, a carrier provided with a rotary wrench including a socket exposed at the periphery of said carrier, said periphery being provided with seats, at opposite sides of said socket, adapted to receive a bridge washer, a nut-holder immediately above said carrier adapted to hold a row of nuts, said nut-holder being open at the bottom so that the bottom nut in the row will rest upon the periphery of said carrier, a holder for the bridge washers located above said carrier and having an open bottom so that the bottom bridge washer will rest upon said carrier, intermittent driving mechanism whereby an intermittent motion is imparted to said carrier, said nut-holder being at the path of said socket to drop the nuts into said wrench and the other holder being at the path of said seats to locate the bridge washers on the seats, and means whereby said wrench is rotated while said carrier is at rest, said wrench being provided with an opening into which the valve stem may be inserted to receive the rotating nut.

7. In an apparatus for assembling nuts and bridge washers on valve stems of pneumatic tubes, a rotatable carrier provided with a rotary wrench including a non-circular socket exposed at the periphery of said rotary carrier, said periphery being provided with recesses, at opposite sides of said socket, adapted to receive a bridge washer, a nut-holder immediately above said carrier adapted to hold a row of nuts, said nut-holder being open at the bottom so that the bottom nut in the row will rest upon the periphery of said carrier, a holder for the bridge washers located above said carrier and having an open bottom so that the bottom bridge washer will rest upon said carrier, intermittent driving mechanism whereby an intermittent rotary motion is imparted to said carrier, said nut-holder being at the path of said socket to drop the nuts into said wrench and the other holder being at the path of said recesses to drop the bridge washers into the recesses, and means whereby said wrench is rotated while said carrier is at rest, said wrench being provided with an opening into which the valve stem may be inserted to receive the rotating nut.

8. In an apparatus for applying nuts and bridge washers to the valve stems of pneumatic tubes, an assembling station where said parts are assembled, a delivery station provided with a holder wherein a row of nuts are confined, a carrier including a wrench adapted to be alined with said holder to receive the nut at the end of the row, operating means whereby said carrier is driven to move the wrench and nut from said delivery station to said assembling station, means whereby said wrench is rotated at said assembling station, the last mentioned means including a friction clutch through which the rotary motion is transmitted, means for varying the friction at said clutch to determine the ultimate pressure at the nut, and a restraining member to prevent rotation of the valve stem at said assembling station, said restraining member being rigidly secured to said carrier and surrounded by a rotary portion of said wrench.

9. In an apparatus for applying nuts and bridge washers to valve stems of pneumatic tubes, a rotatable carrier provided with a series of rotary wrenches each including a non-circular socket exposed at the periphery of said rotary carrier, said periphery being provided with recesses, at opposite sides of each wrench, adapted to receive a bridge washer, a nut-holder immediately above said carrier adapted to hold a row of nuts, said nut-holder being open at the bottom so that the bottom nut in the row will rest upon the periphery of said carrier, a holder for the bridge washers located above said carrier and having an open bottom so that the bottom bridge washer will rest upon said carrier, intermittent driving mechanism whereby an intermittent rotary motion is imparted to said carrier, said nut-holder being at the path of the sockets to drop a nut into each wrench and the other holder being at the path of said recesses to drop a bridge washer over each nut, and means whereby said wrenches are rotated while said carrier is at rest, each wrench being provided with an opening into which the valve stem may be inserted to receive the rotating nut.

In testimony that we claim the foregoing we hereunto affix our signatures.

JOHN A. FLEISCHLI.
JOSEPH M. KOUNTZMAN.

CERTIFICATE OF CORRECTION.

Patent No. 1,807,591. Granted June 2, 1931, to

JOHN A. FLEISCHLI ET AL.

It is hereby certified that the assignee in the above numbered patent was erroneously described and specified as "Cupples Company", whereas said assignee should have been described and specified as Cupples Company Manufacturers, as shown by the records of assignments in this office; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.